US 6,563,253 B2

(12) United States Patent
Diefenbach et al.

(10) Patent No.: US 6,563,253 B2
(45) Date of Patent: May 13, 2003

(54) PIEZOELECTRIC ACTUATOR

(75) Inventors: Gerhard Diefenbach, Aachen (DE); Christian Reichinger, Alsdorf (DE)

(73) Assignee: Koninklijke Philips Electronics, N.V., Einhoven (NL)

( * ) Notice: Subject to any disclaimer, the term of this patent is extended or adjusted under 35 U.S.C. 154(b) by 0 days.

(21) Appl. No.: 09/796,968

(22) Filed: Mar. 1, 2001

(65) Prior Publication Data
US 2001/0028205 A1 Oct. 11, 2001

(30) Foreign Application Priority Data
Mar. 4, 2000 (DE) .......................... 100 10 707

(51) Int. Cl.⁷ ............................................. H02M 2/00
(52) U.S. Cl. ............. 310/328; 310/323.01; 310/323.02; 310/323.17
(58) Field of Search .................. 310/328, 323.01, 310/323.02, 323.17

(56) References Cited

U.S. PATENT DOCUMENTS

| | | | | |
|---|---|---|---|---|
| 4,019,073 A | | 4/1977 | Vishnevsky et al. | 310/8.2 |
| 4,249,100 A | * | 2/1981 | Vasiliev et al. | 310/317 |
| 4,613,782 A | * | 9/1986 | Mori et al. | 310/323.16 |
| 4,884,002 A | * | 11/1989 | Eusemann et al. | 310/323.02 |
| 4,997,177 A | * | 3/1991 | Mori et al. | 271/267 |
| 5,563,465 A | * | 10/1996 | Nakahara et al. | 310/317 |
| 5,696,421 A | * | 12/1997 | Zumeris et al. | 310/323.02 |
| 5,712,524 A | * | 1/1998 | Suga | 310/323.02 |
| 6,068,256 A | * | 5/2000 | Slutskiy et al. | 271/264 |
| 6,121,717 A | * | 9/2000 | Diefenbach et al. | 310/323.02 |
| 6,201,340 B1 | * | 3/2001 | Matsuda et al. | 310/323.02 |

* cited by examiner

*Primary Examiner*—Thomas M. Dougherty
*Assistant Examiner*—J. Aguirrechea
(74) *Attorney, Agent, or Firm*—Ernestine C. Barlett

(57) ABSTRACT

The invention relates to a piezoelectric actuator (1) for driving a movable part (2), for example a rotor, having an elongate piezoelectric resonator (3), which serves to perform longitudinal vibrations and which is acted upon by elastic means (10), for example a spring (10). The elastic means (10) acts upon the piezoelectric resonator (3) mainly in the longitudinal direction (11) and serves to exert a force on the resonator (3) in a direction towards the movable part (2), the resonant frequency of the elastic means (10) being substantially smaller than the resonant frequency of the piezoelectric resonator (3), and the piezoelectric resonator (3) is guided by at least one guide element (4, 5) in a direction perpendicular to its longitudinal direction (11). This enables the resonator (3) to vibrate as freely as possible, which leads to a higher efficiency.

11 Claims, 1 Drawing Sheet

PIEZOELECTRIC ACTUATOR

Figure 1:
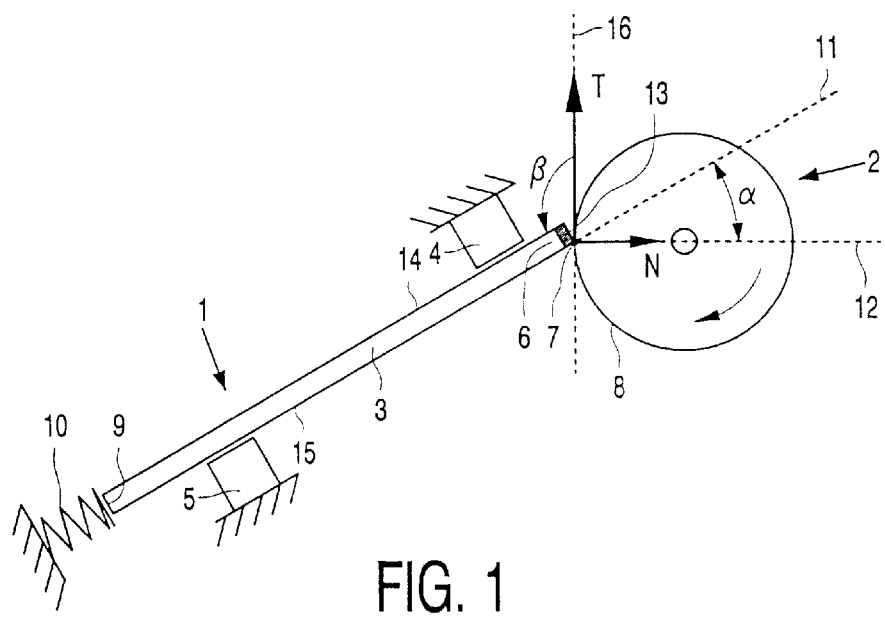

The invention relates to a piezoelectric actuator for driving a movable part by means of an elongate piezoelectric resonator, which serves to perform longitudinal vibrations and which is acted upon by elastic means.

The use of piezoelectric drives in small electrical appliances becomes increasingly significant because drives of this type are very robust, compact and flexible in use. The document U.S. Pat. No. 4,019,073 describes such a piezoelectric drive. It relates to a longitudinally vibrating piezoelectric resonator, which drives a shaft. Furthermore, the piezoelectric resonator has its end which faces the shaft secured to a spring, which spring exerts a force perpendicular to the rotor and urges the latter against the force. This has an adverse effect on the efficiency.

It is an object of the invention to provide a piezoelectric actuator having a high efficiency.

According to the invention this object is achieved in that at least one piezoelectric resonator and a spring means, which exerts a force on the piezoelectric resonator at least in the direction of its longitudinal vibrations, are arranged in such a manner that the spring means acts upon the piezoelectric resonator, the resonant frequency of the spring means being substantially lower than the resonant frequency of the piezoelectric resonator.

This solution has the major advantage that the piezoelectric resonator can vibrate in a longitudinal direction of vibration without having to overcome any large resistances. When the resonator expands it exerts a force on the movable part, as a result of which the movable part is set into motion. This force can be exerted only when it experiences a counteracting force. This counteracting force is applied by the elastic means. When the resonator contracts, the counteracting force of the elastic means should be as small as possible. This is possible because the piezoelectric resonator and the elastic means are not secured to one another but merely abut against one another and can also become disengaged from one another as a result of the different resonant frequencies of the piezoelectric resonator and the spring means. The efficiency of a piezoelectric resonator increases according as it can vibrate more freely. In contrast thereto, the piezoelectric resonator in accordance with U.S. Pat. No. 4,019,073 requires a part of the applied electrical energy to overcome frictional resistances and to tension the spring means.

In the embodiment defined in claim 2 the piezoelectric resonator drives a rotor. In order to increase the efficiency even further it is important to find the optimum angle between the piezoelectric resonator and the rotor. This angle depends inter alia on the nature of the material of the resonator and the rotor and the coefficient of friction, which depends thereon. The optimum angle can be calculated and set by means of this coefficient.

The embodiment defined in claim 3 has the advantage that at its end which faces the rotor the piezoelectric resonator cannot move away from the rotor. This ensures in a reliable manner that the resonator cannot leave the rotor.

In the embodiment defined in claim 4 the problem is solved that as a result of the friction between the piezoelectric resonator and the guide elements and the pressure of the resonator on the rotor the angle increases in the course of time because material is eroded as a result of wear. In order to preclude this, the angle is chosen so as to be slightly smaller than calculated, which allows for the increase of the angle during operation.

The embodiment defined in claim 5 improves the power transmission of the piezoelectric resonator. In order to increase the efficiency, it is advantageous to deposit a hard material on the end of the piezoelectric resonator which faces the rotor. This material is wear resistant and at the same time provides the high coefficient of friction required for a correct power transmission between the resonator and the rotor.

The multi-layer resonator defined in claim 6 can operate with substantially lower voltages than a conventional single-layer resonator. This reduces the power consumption.

By means of the embodiment defined in claim 7 it is achieved that less energy is transferred to the guide elements via the contact areas between the resonator and guide elements in a direction normal to the resonator. Therefore, a deliberate acoustic mismatch of the resonator and the guide elements is provided.

According to claim 8 the piezoelectric actuator is used for driving the cutting members in an electric shaver. This provides a substantial reduction of the power consumption and the weight in comparison with shavers having conventional electric motors.

The embodiments defined in claims 9 and 10 concern a shaver having rotary cutting members. The use of the space-saving piezoelectric actuators makes it possible to provide a separate drive for each of the rotors of a shaver having a plurality of rotors. This enables the rotors to be driven fully independently of one another and with different speeds. Conventional electric motors require so much space that particularly in shavers there is room for only one motor. Speed differences between the commonly driven rotors can then be realized only by means of a gear transmission, which renders the construction more intricate and does not variable differences in speed between the rotors.

Hereinafter, embodiments of the invention will be described in more detail by way of example with reference to the drawing.

Figure 2:
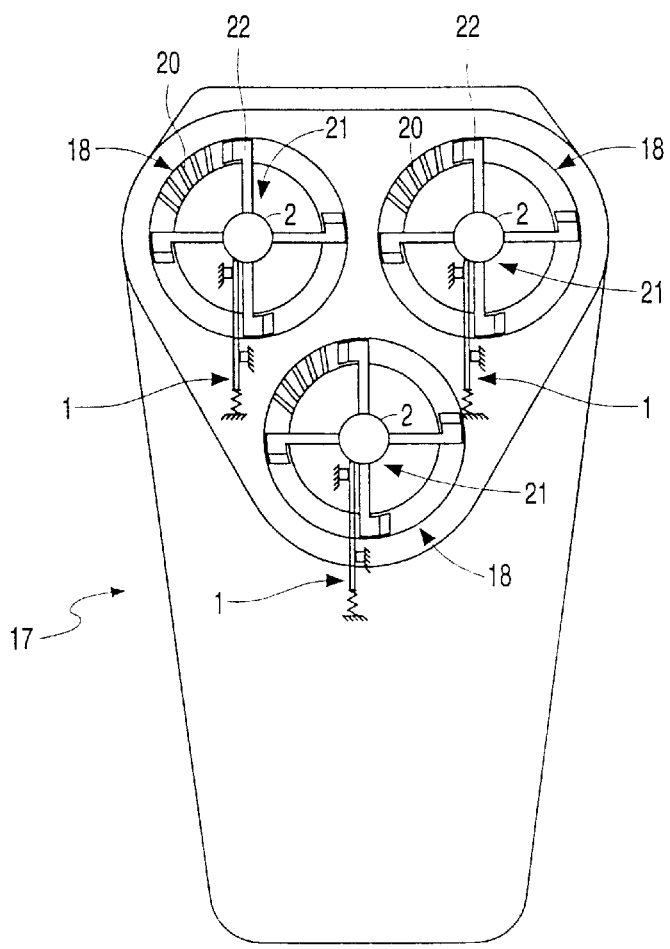

In the drawing:

FIG. 1 shows a piezoelectric actuator having a piezoelectric resonator, guide elements, a spring and a rotor to be driven, and FIG. 2 is a diagrammatic plan view of an electrically powered shaver having three piezoelectric actuator and three rotary cutting members.

FIG. 1 illustrates the principle of a piezoelectric actuator 1, which drives a rotor 2. The actuator has an elongate resonator 3, which can perform longitudinal vibrations between guide elements 4, 5. One end 6 of the resonator 6 has a point of contact 7 with the circumferential surface 8 of the rotor 2. Here, the power transmission takes place in order to set the rotor into rotation. A spring 10 acts upon the other end 9 of the resonator, in such a manner that the direction of the spring force acting upon the resonator is substantially the same as the longitudinal direction 11 of the resonator. The spring merely acts upon the resonator without being secured thereto. However, it may alternatively act upon another part of the resonator.

The resonator 3 and the rotor 2 form an acute angle $\alpha$. The angle $\alpha$ is the angle between the longitudinal direction 11 of the resonator 3 and the normal to the circumferential surface 8 of the rotor through the point of contact 7. The angle $\alpha$ required for an optimum efficiency can be computed with the aid of the friction coefficient between the piezoelectric resonator 3 and the rotor 2. For this, reference may be made to EP 01313130. However, in order to allow for the effects of wear the angle $\alpha$ is selected to be slightly smaller than the optimum angle $\alpha$ calculated on the basis of the friction coefficient between the piezoelectric resonator 3 and the rotor 2. This friction coefficient can be increased by the choice of a layer of another material deposited onto the end 6 of the piezoelectric resonator 3. Preferably, the layer of said material is also hard in order to obtain a high contact stiffness. In the case of a high contact stiffness only a small portion of the vibration amplitude of the piezoelectric resonator is required to produce the normal force. The resonator is longer clear of the rotor and is therefore of a higher quality, i.e. a larger vibration amplitude for the same applied voltage, a higher speed at the same output torque. For this purpose the rotor 2 is also provided with a layer or is made wholly of the hard material. The material layer 13 and the cladding of the rotor should therefore be adapted to one another in such a manner that the contact stiffness and at the same time the friction coefficient between these two materials is large. Preferably, the hard material is $Al_2O_3$.

In order to allow only movements of the piezoelectric resonator 3 in its direction of vibration, the resonator is guided by two diagonally opposed guide elements 4, 5. These guide elements cooperate with guide surfaces 14, 15 of the resonator 3 and are configured in such a way that the piezoelectric resonator can freely perform longitudinal vibrations between them. For this purpose, the guide elements 4, 5 are made of a material having a smaller acoustic impedance than the piezoelectric resonator 3. This prevents to the largest possible extent that energy is transferred from the resonator 3 to the guide elements 4, 5. In order to enable a better guiding to be obtained in the case of a longer piezoelectric resonator it is also possible to provide more than the two guide elements shown. Moreover, FIG. 1 shows that the guide elements are arranged in such a way that the guide element 4, which cooperates with the guide surface 14 of the piezoelectric resonator 3, which guide surface 14 tends to move away from the rotor 4 during operation, is situated closer to the rotor 2 than the other guide element 5. In other words: the guide surface 14 of the resonator 3, which surface cooperates with the guide element 4, forms an angle β greater than 90° with respect to the tangential plane 16 to the circumferential surface 8 of the rotor, which plane extends through the point of contact 7.

In the rest position of the resonator 3 the spring 10 is applied to the resonator under a small pre-load. In operation the resonator performs longitudinal vibrations, i.e. it expands and contracts alternately. During the expansion period the point of contact 7 of the resonator hits the circumferential surface 8 of the rotor 2, which results in a normal force N and a tangential force T on the rotor. The tangential force T causes a rotation of the rotor, while the normal force N produces a reactive force on the resonator 3, which is absorbed by the spring 10 and by the guide elements 4, 5. During the contraction period the end 9 of the resonator 3 is disengaged at least temporarily from the spring 10 owing to the large difference in the resonant frequencies of the spring 10 and the resonator 3.

FIG. 2 shows an electrically powered shaver 17 having three rotary shaving heads 18. Each shaving head has an outer cutting member 19 with hair entry apertures 20 and an inner cutting member 21, which is drivable with respect to the outer cutting member 19. The inner cutter 21 has a rotary shaft 2 on which the cutters 22 are arranged. This shaft also forms the rotor 2 described with reference to FIG. 1 and which is driven by the piezoelectric actuator 1. Thus, each inner cutting member 21 is driven directly by an actuator 1. This enables a gear transmission to be dispensed with. This is particularly useful if the cutting members 20 should operate with different speeds. The rotors can be driven fully independently of one another. It is also possible to drive each rotor by means of more than one actuator.

Instead of for driving a rotor a piezoelectric actuator in accordance with the invention may also be used for an oscillatory drive of an appliance, for example for driving a cutting member of a so-called vibratory shaver. This may require the use of a reduction gear.

What is claimed is:

1. A piezoelectric actuator (1) for driving a movable part (2), having an elongate piezoelectric resonator (3), which serves to perform substantially longitudinal vibrations only, and which is acted upon by elastic means (10), characterized in that the elastic means (10) acts upon the piezoelectric resonator (3) mainly in the longitudinal direction and serves to exert a force on the resonator (3) in a direction towards the movable part (2), the resonant frequency of the elactic means (10) is substantially smaller than the resonant frequency of the piezoelectric resonator (3), and the piezoelectric resonator (3) is guided by at least one guide element (4, 5) in a direction perpendicular to its longitudinal direction (11).

2. A piezoelectric actuator as claimed in claim 1, characterized in that the piezoelectric resonator (3) drives a rotor (2), the direction of vibration of the piezoelectric resonator (3) forming an acute angle (α) with respect to a normal (12) which extends perpendicularly to a tangential plane (16) through a point of contact (7) of the rotor (2) and the resonator (3), and this angle (α) is greater than zero and provides the maximal efficiency.

3. A piezoelectric actuator as claimed in claim 2, characterized in that the piezoelectric resonator (3) has at least two facing guide surfaces (14, 15) which cooperate with the guide elements (4, 5), the guide element (4) which cooperates with the guide surface (14) of the piezoelectric resonator (3), which guide surface forms an angle (β) greater than 90° with respect to the tangential plane (16) to the rotor (2) through the point of contact (7) of the rotor (2) and the resonator (3), being situated closer to the rotor (2) than any other guide element (5), in order to prevent the piezoelectric resonator (3) from being moved off the rotor (2).

4. A piezoelectric actuator as claimed in claim 2, characterized in that the angle (α) is selected to be smaller than the optimum angle for which the efficiency is maximal.

5. A piezoelectric actuator as claimed in claim 2, characterized in that the piezoelectric resonator (1), at its point of contact with the rotor (4), and the rotor (4) itself have a cladding of a very hard material.

6. A piezoelectric actuator as claimed in claim 1, characterized in that the material of the guide elements (2a, 2b) has a smaller acoustic impedance than the material of the piezoelectric resonator (1).

7. An electrically powered shaver having at least one cutting member (21) driven by at least one piezoelectric actuator as claimed in claim 1.

8. An electrically powered shaver having at least one cutting member (21) driven by at least one piezoelectric actuator, characterized in that the cutting member (21) has a rotor (2) which is rotationally drivable by an actuator (1) as claimed in any one of the claims 2 to 5 or 7 or 12.

9. An electrically powered shaver as claimed in claim 8, characterized in that it has at least two cutting members (21) which are rotationally drivable by rotors (2) and the rotors (2) are rotatable with mutually different speeds.

10. A piezoelectric actuator as claimed in claim 5, characterized in that the very hard material is $Al_2O_3$.

11. A piezoelectric actuator (1) for driving a movable part (2), having an elongate piezoelectric resonator (3), which serves to perform substantially longitudinal vibrations only, and which is acted upon by elastic means (10), characterized in that the elastic means (10) acts upon the piezoelectric resonator (3) mainly in the longitudinal direction and serves to exert a force on the resonator (3) in a direction towards the movable part (2), the resonant frequency of the elastic means (10) is substantially smaller than the resonant frequency of the piezoelectric resonator (3), and the piezoelectric resonator (3) is guided by at least one guide element (4, 5) in a direction perpendicular to its longitudinal direction (11), said at least one guide element being made of a material having a smaller acoustic impedance than the acoustic impedance of the material of the piezoelectric resonator.

* * * * *